United States Patent
Baek et al.

(10) Patent No.: US 10,331,607 B2
(45) Date of Patent: Jun. 25, 2019

(54) METHOD FOR DETECTING CABLE INSERTION AND AN ELECTRONIC DEVICE THEREOF

(71) Applicant: Samsung Electronics Co., Ltd., Suwon-si (KR)

(72) Inventors: Su-Ho Baek, Daegu (KR); Intae Jun, Daegu (KR); Jae-Jin Kwak, Gumi-si (KR); Cheoleun Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/789,240

(22) Filed: Oct. 20, 2017

(65) Prior Publication Data
US 2018/0113832 A1 Apr. 26, 2018

(30) Foreign Application Priority Data
Oct. 24, 2016 (KR) .................. 10-2016-0138327

(51) Int. Cl.
*G06F 1/26* (2006.01)
*G06F 13/40* (2006.01)
*G06F 13/42* (2006.01)

(52) U.S. Cl.
CPC .......... *G06F 13/4081* (2013.01); *G06F 1/266* (2013.01); *G06F 13/4226* (2013.01)

(58) Field of Classification Search
CPC . G06F 1/263; G06F 1/266; G06F 1/28; G06F 13/4063; G06F 13/4068; G06F 13/4081; G06F 13/4226; G06F 13/4265; G06F 13/4282
See application file for complete search history.

(56) References Cited

U.S. PATENT DOCUMENTS

| | | | |
|---|---|---|---|
| 6,920,569 B1* | 7/2005 | Wauters | G06F 13/4022 713/300 |
| 2004/0133722 A1* | 7/2004 | Croyle | G06F 13/387 710/105 |
| 2005/0114580 A1 | 5/2005 | Ede | |
| 2005/0174710 A1* | 8/2005 | Masui | G06F 1/266 361/92 |

(Continued)

FOREIGN PATENT DOCUMENTS

| KR | 20130019836 A | 2/2013 |
|---|---|---|
| WO | 2008068311 A2 | 6/2008 |

OTHER PUBLICATIONS

Communication from a foreign patent office in a foreign counterpart application, European Patent Office, "European Search Report," Application No. EP 17 19 8028.7, dated Mar. 12, 2018, 7 pages.

(Continued)

*Primary Examiner* — Thomas J Cleary

(57) ABSTRACT

A method for sensing cable insertion into a connection installed in an electronic device. The electronic device includes a connector for inserting a cable, a first power manager configured to, when power is provided from the cable, output a signal corresponding to the power, a second power manager configured to transmit information instructing a supplying of the power to a processor, in accordance with the output of the signal, and the processor configured to control opening a path for the cable in accordance with the information.

20 Claims, 10 Drawing Sheets

(56) References Cited

U.S. PATENT DOCUMENTS

| | | | |
|---|---|---|---|
| 2006/0075152 A1* | 4/2006 | Zhu | G06F 13/4081 710/15 |
| 2007/0162666 A1* | 7/2007 | Ise | G06F 13/385 710/62 |
| 2007/0260783 A1* | 11/2007 | Combs | G06F 1/266 710/62 |
| 2009/0082910 A1* | 3/2009 | Sato | G06F 1/263 700/297 |
| 2010/0090644 A1* | 4/2010 | Nokkonen | G06F 1/26 320/107 |
| 2010/0259399 A1* | 10/2010 | Tanno | G06F 13/4081 340/635 |
| 2011/0314201 A1* | 12/2011 | Su | H02J 7/0055 710/316 |
| 2012/0246350 A1* | 9/2012 | Lee | H02J 7/0008 710/16 |
| 2013/0043739 A1 | 2/2013 | Kim et al. | |
| 2014/0004741 A1* | 1/2014 | Jol | H01R 29/00 439/620.01 |
| 2014/0183974 A1* | 7/2014 | Proefrock | G06F 1/266 307/113 |
| 2014/0208134 A1* | 7/2014 | Waters | G06F 13/385 713/310 |
| 2015/0002078 A1* | 1/2015 | Jung | H02J 7/0072 320/107 |
| 2015/0156089 A1* | 6/2015 | McCleland | H04L 43/08 307/1 |
| 2017/0139467 A1* | 5/2017 | Waters | G06F 1/3287 |
| 2017/0329381 A1* | 11/2017 | Chew | G06F 1/263 |

OTHER PUBLICATIONS

Compaq, et al, "Universal Serial Bus Specification Revision 2.0," Apr. 27, 2000, XP001152265, 5 pages.

\* cited by examiner

METHOD FOR DETECTING CABLE INSERTION AND AN ELECTRONIC DEVICE THEREOF

CROSS REFERENCE TO RELATED APPLICATIONS

The present application is related to and claims priority under 35 U.S.C. § 119(a) to Korean Patent Application No. 10-2016-0138327, filed Oct. 24, 2016, the contents of which are herein incorporated by reference.

TECHNICAL FIELD

Various exemplary embodiments of the present disclosure relate to a method for sensing that a cable is inserted into a connector, and an electronic device thereof.

BACKGROUND

Owing to the recent development of electronic communication industries, electronic devices such as smart phones are becoming a necessity of modern society, while becoming a significant means for delivery of fast changing information. Generally, the electronic device can include at least one connector for the sake of charging or connection with another device. For example, the electronic device can be equipped with an interface (IF) connector into which a universal asynchronous receiver/transmitter (UART) cable can be inserted. Here, the IF connector can be used for jig cable insertion for device test in the electronic device as well.

By recognizing a resistance value generated in some ports of the IF connector at cable connection, the IF connector can sense the insertion of a cable. But, when a moisture or foreign material is introduced into the IF connector, resistance can be generated in the IF connector, and a malfunction related to a UART cable can take place in the IF connector. In this case, erroneous determination that the cable has been inserted can happen. And, an electric current can be leaked out, resulting in the corrosion of the IF connector.

SUMMARY

To address the above-discussed deficiencies, it is a primary object to provide a method for determining whether a cable has been inserted into a connector of an electronic device, and the electronic device thereof.

Various exemplary embodiments of the present disclosure provide a method for determining whether a cable has been inserted without additional hardware installation, and an electronic device thereof.

Various exemplary embodiments of the present disclosure provide a method for determining whether a cable has been inserted using information generated from a power management circuit, and an electronic device thereof.

According to various exemplary embodiments of the present disclosure, an electronic device includes a connector for inserting a cable, a first power manager configured to, when power is provided from the cable, output a signal corresponding to the power, a second power manager configured to transmit information instructing a supplying of the power to a processor, in accordance with the output of the signal, and the processor configure to control opening a path for the cable in accordance with the information.

According to various exemplary embodiments of the present disclosure, a method for operating an electronic device includes when power is provided from a cable inserted into a connector, generating a signal corresponding to the power, providing information instructing a supplying of the power to a processor, in accordance with the signal, and controlling to open a path for the cable in accordance with the information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
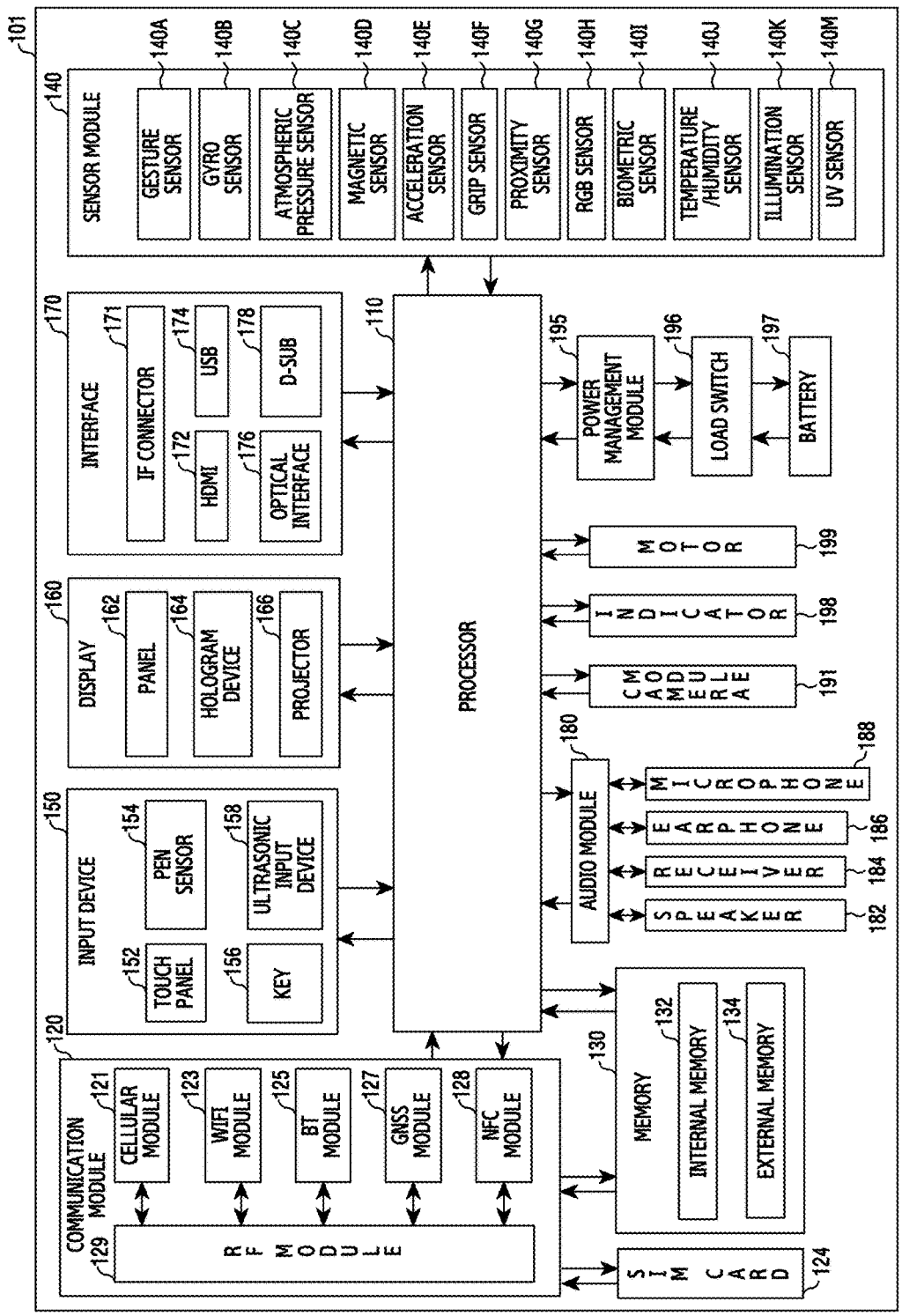
FIG. 1 illustrates a block diagram of an electronic device according to various exemplary embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

FIG. 1 illustrates a block diagram of an electronic device 101 according to various embodiments. The electronic device 101 may include at least one processor (e.g., Application Processor (AP)) 110, a communication module 120, a Subscriber Identification Module (SIM) 124, a memory 130, a sensor module 140, an input device 150, a display 160, an interface 170, an audio module 180, a camera module 191, a power management module 195, a battery 197, an indicator 198, and a motor 199.

The processor 110 may control a plurality of hardware or software components connected to the processor 110 by driving an operating system or an application program and perform processing of various pieces of data and calculations. The processor 110 may be implemented by, for example, a System on Chip (SoC). According to an embodiment, the processor 110 may further include a Graphic Processing Unit (GPU) and/or an image signal processor. The processor 110 may include at least some (e.g., a cellular module 121) of the elements illustrated in FIG. 1. The processor 110 may load, into a volatile memory, instructions or data received from at least one (e.g., a non-volatile memory) of the other elements and may process the loaded instructions or data, and may store various data in a non-volatile memory.

The communication module 120 may include, for example, the cellular module 121, a Wi-Fi module 123, a Bluetooth (BT) module 125, a GNSS module 127 (e.g., a GPS module, a Glonass module, a Beidou module, or a Galileo module), an NFC module 128, and a Radio Frequency (RF) module 129.

The cellular module 121 may provide a voice call, image call, a text message service, or an Internet service through, for example, a communication network. According to an embodiment, the cellular module 121 may distinguish between and authenticate electronic devices 101 within a communication network using a subscriber identification module (for example, the SIM card 124). According to an embodiment of the present disclosure, the cellular module 121 may perform at least some of the functions that the processor 110 may provide. According to an embodiment, the cellular module 121 may include a Communication Processor (CP).

Each of the Wi-Fi module 123, the BT module 125, the GNSS module 127, and the NFC module 128 may include, for example, a processor for processing data transmitted and received through the relevant module. According to some embodiments of the present disclosure, at least some (e.g., two or more) of the cellular module 121, the Wi-Fi module 123, the BT module 125, the GNSS module 127, and the NFC module 128 may be included in one Integrated Chip (IC) or IC package.

The RF module 129 may transmit/receive, for example, a communication signal (for example, an RF signal). The RF module 129 may include, for example, a transceiver, a Power Amplifier Module (PAM), a frequency filter, a Low Noise Amplifier (LNA), and an antenna. According to another embodiment of the present disclosure, at least one of the cellular module 121, the Wi-Fi module 123, the BT module 125, the GNSS module 127, and the NFC module 128 may transmit and receive RF signals through a separate RF module.

The subscriber identification module 124 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 130 (for example, the memory 130) may include, for example, an internal memory 132 or an external memory 134. The internal memory 132 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 134 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 134 may be functionally and/or physically connected to the electronic device 101 through various interfaces.

The sensor module 140 may measure a physical quantity or detect an operation state of the electronic device 101, and may convert the measured or detected information into an electrical signal. For example, the sensor module 140 may include at least one of a gesture sensor 140A, a gyro sensor 140B, an atmospheric pressure sensor 140C, a magnetic sensor 140D, an acceleration sensor 140E, a grip sensor 140F, a proximity sensor 140G a color sensor 140H (for example, a Red/Green/Blue (RGB) sensor), a bio-sensor 140I, a temperature/humidity sensor 140J, a light sensor 140K, and an Ultra Violet (UV) sensor 140M. Additionally or alternatively, the sensor module 140 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 140 may further include a control circuit for controlling one or more sensors included therein. In some embodiments of the present disclosure, the electronic device 101 may further include a processor configured to control the sensor module 140 as a part of or separately from the processor 110, and may control the sensor module 140 while the processor 110 is in a sleep state.

The input device 150 may include, for example, a touch panel 152, a (digital) pen sensor 154, a key 156, or an ultrasonic input device 158. The touch panel 152 may use at least one of, for example, a capacitive type, a resistive type, an infrared type, and an ultrasonic type. Also, the touch panel 152 may further include a control circuit. The touch panel 152 may further include a tactile layer and provide a tactile reaction to the user.

The (digital) pen sensor 154 may include, for example, a recognition sheet which is a part of the touch panel or is separated from the touch panel. The key 156 may include, for example, a physical button, an optical key or a keypad. The ultrasonic input device 158 may detect ultrasonic wavers generated by an input tool through a microphone (for example, a microphone 188) and identify data corresponding to the detected ultrasonic waves.

The display 160 may include a panel 162, a hologram device 164 or a projector 166. The panel 162 may be implemented to be, for example, flexible, transparent, or wearable. The panel 162 and the touch panel 152 may be implemented as one module. The hologram 264 may show a three dimensional image in the air by using an interference of light. The projector 166 may display an image by projecting light onto a screen. The screen may be located, for example, inside or outside the electronic device 101. According to an embodiment, the display 160 may further include a control circuit for controlling the panel 162, the hologram device 164, or the projector 166.

The interface 170 may include, for example, a High-Definition Multimedia Interface (HDMI) 172, a Universal Serial Bus (USB) 174, an optical interface 176, or a D-sub-miniature (D-sub) 178. Additionally or alternatively, the interface 170 may include, for example, a Mobile High-definition Link (MHL) interface, a Secure Digital (SD) card/Multi-Media Card (MMC) interface, or an Infrared Data Association (IrDA) standard interface.

The audio module 180 may bilaterally convert, for example, a sound and an electrical signal. The audio module 180 may process sound information which is input or output through, for example, a speaker 182, a receiver 184, earphones 186, the microphone 188 or the like.

The camera module 191 is a device which may photograph a still image and a dynamic image. According to an embodiment, the camera module 191 may include one or more image sensors (for example, a front sensor or a back sensor), a lens, an Image Signal Processor (ISP) or a flash (for example, LED or xenon lamp).

The power management module 195 may manage, for example, power of the electronic device 101. According to an embodiment, the power management module 195 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 197, and a voltage, a current, or a temperature during the charging. The battery 197 may include, for example, a rechargeable battery or a solar battery. The load switch 196 controls a path of power according to using the battery 197 or an external power source.

The indicator 198 may display a particular state (e.g., a booting state, a message state, a charging state, or the like) of the electronic device 101 or a part (e.g., the processor 110). The motor 298 may convert an electrical signal into mechanical vibration, and may generate vibration, a haptic effect, or the like. Although not illustrated, the electronic device 101 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 2:
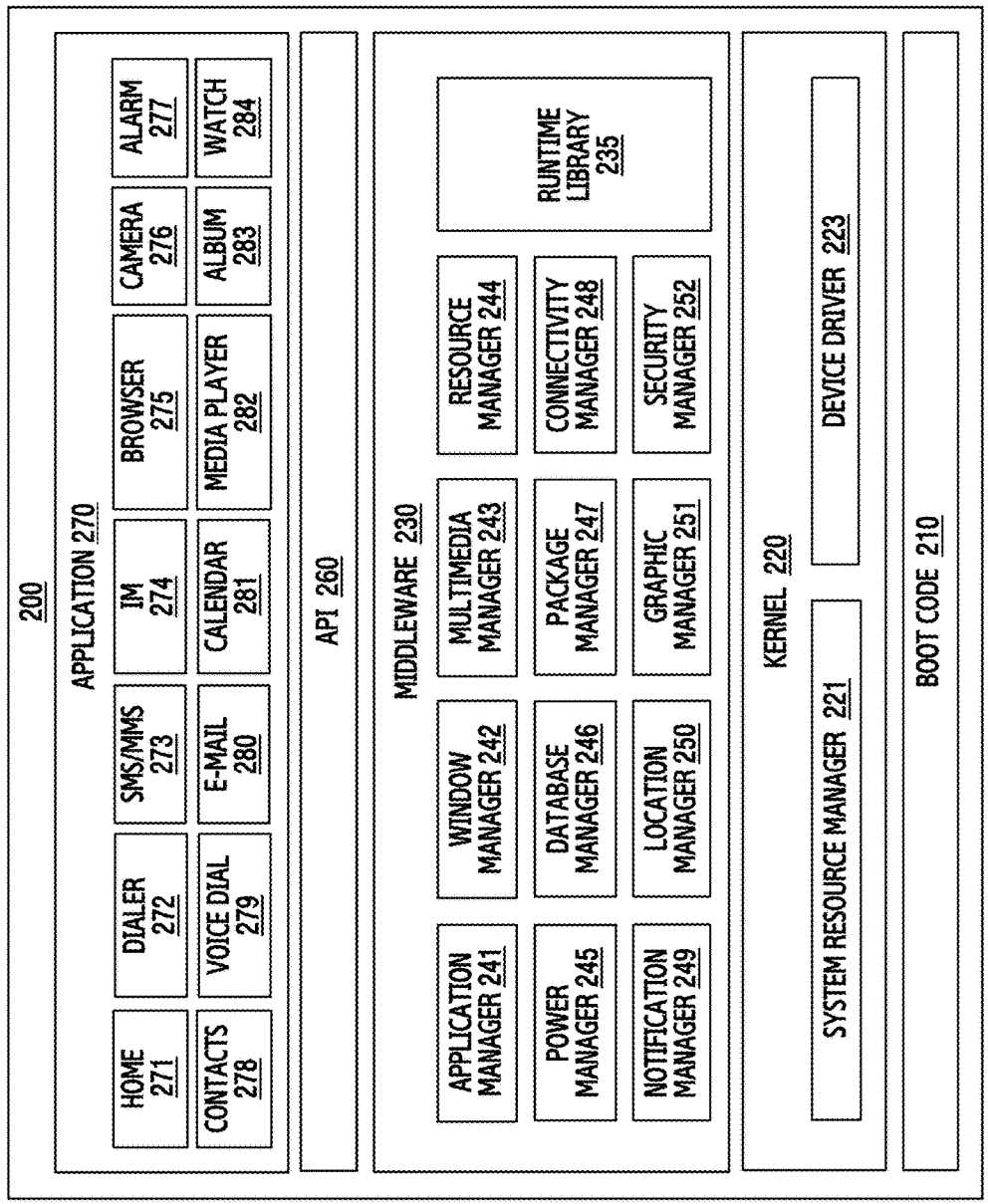
FIG. 2 illustrates a block diagram of a program module according to various exemplary embodiments of the present disclosure.

FIG. 2 illustrates a block diagram of a program module 200 according to various exemplary embodiments. According to an exemplary embodiment, the program module 200 may include an Operating System (OS) controlling resources related to an electronic device (e.g., the electronic device 101) and/or various applications run on the operating system. The operating system may, for example, include Android™, iOS™, Windows™, Symbian™, Tizen™, or Bada™. Referring to FIG. 2, the program module 200 may include a boot code 210, a kernel 220, a middleware 230, an API 260, and/or an application 270. At least a part of the program module 200 may be preloaded on the electronic device or be downloaded from an external electronic device.

The boot code 210 is a set of basic instructions that have to be executed at the time of starting up, i.e., booting of the electronic device 101. Here, the booting may be carried out by the pressing of a power key, the insertion of a cable providing power, a reset, etc. At the time of booting, the boot code 210 is read by a processor (e.g., the processor 110) and a memory (e.g., the memory 130). The boot code 210 enables the electronic device 101 to be in a ready state for reading and executing an operating system (OS). The kernel 220 may, for example, include a system resource manager 221 and/or a device driver 223. The system resource manager 221 may perform control of a system resource, allocation thereof, or recovery thereof. According to an exemplary embodiment, the system resource manager 221 may include a process management unit, a memory management unit, or a file system management unit. The device driver 223 may, for example, include a display driver, a camera driver, a Bluetooth driver, a shared memory driver, a USB driver, a keypad driver, a WiFi driver, an audio driver, or an inter-process communication (IPC) driver.

The middleware 230 may provide a function used by the applications 270 in common or provide various functions to the applications 270 through the API 260 so that the applications 270 can efficiently use limited system resources within the electronic device. According to an embodiment, the middleware 230 may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include a library module that a compiler uses in order to add a new function through a programming language while the applications 270 are being executed. The runtime library 235 may perform input/output management, memory management, the functionality for an arithmetic function, or the like.

The application manager 241 may manage, for example, the life cycle of at least one of the applications 270. The window manager 242 may manage Graphical User Interface (GUI) resources used for the screen. The multimedia manager 243 may determine a format used to reproduce various media files, and may encode or decode a media file by using a coder/decoder (codec) appropriate for the relevant format. The resource manager 244 may manage resources, such as a source code, a memory, a storage space, and the like of at least one of the applications 270.

The power manager 245 may operate together with a Basic Input/Output System (BIOS) to manage a battery or power and may provide power information used for the operation of the electronic device. The database manager 246 may generate, search for, and/or change a database to be used by at least one of the applications 270. The package manager 247 may manage the installation or update of an application distributed in the form of a package file.

The connectivity manager 248 may manage a wireless connection such as, for example, Wi-Fi or Bluetooth. The notification manager 249 may display or notify of an event, such as an arrival message, an appointment, a proximity notification, and the like, in such a manner as not to disturb the user. The location manager 250 may manage location information of the electronic apparatus. The graphic manager 251 may manage a graphic effect, which is to be provided to the user, or a user interface related to the graphic effect. The security manager 252 may provide various security functions used for system security, user authentication, and the like. According to an embodiment of the present disclosure, when the electronic apparatus (e.g., the electronic device 101) has a telephone call function, the middleware 230 may further include a telephony manager for managing a voice call function or a video call function of the electronic apparatus.

The middleware 230 may include a middleware module that forms a combination of various functions of the above-described elements. The middleware 230 may provide a module specialized for each type of OS in order to provide a differentiated function. Also, the middleware 330 may dynamically delete some of the existing elements, or may add new elements.

The API 260 is, for example, a set of API programming functions, and may be provided with a different configuration according to an OS. For example, in the case of Android or iOS, one API set may be provided for each platform. In the case of Tizen, two or more API sets may be provided for each platform.

The applications 270 may include, for example, one or more applications which can provide functions such as home 271, dialer 272, SMS/MMS 273, Instant Message (IM) 274, browser 275, camera 276, alarm 277, contacts 278, voice dialer 279, email 280, calendar 281, media player 282, album 283, clock 284, health care (for example, measure exercise quantity or blood sugar), or environment information (for example, atmospheric pressure, humidity, or temperature information).

According to an embodiment of the present disclosure, the applications 270 may include an application (hereinafter, referred to as an "information exchange application" for convenience of description) supporting information exchange between the electronic apparatus (e.g., the electronic device 101) and an external electronic apparatus. The application associated with information exchange may include, for example, a notification relay application for forwarding specific information to an external electronic device, or a device management application for managing an external electronic device.

For example, the notification relay application may include a function of delivering, to the external electronic apparatus, notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 270 may include applications (for example, a health care application of a mobile medical appliance or the like) designated according to attributes of the external electronic device. According to an embodiment of the present disclosure, the application 270 may include an application received from the external electronic apparatus. According to an embodiment of the present disclosure, the application 270 may include a preloaded application or a third party application which can be downloaded from the server. Names of the elements of the program module 200, according to the above-described embodiments of the present disclosure, may change depending on the type of OS.

According to various embodiments of the present disclosure, at least some of the program module 200 may be implemented in software, firmware, hardware, or a combination of two or more thereof. At least some of the program module 200 may be implemented (e.g., executed) by, for example, the processor (e.g., the processor 110). At least some of the program module 200 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 110), may cause the one or more processors to execute the function corresponding to the instruction. The computer-readable storage medium may be, for example, the memory 130.

According to various exemplary embodiments of the present disclosure, an electronic device may include a connection unit for inserting a cable, a first power management unit for when power is provided from the cable, outputting a signal corresponding to the provision of the power, a second power management unit for transmitting information instructing the supplying of the power to a processor, in accordance with the output of the signal, and the processor for controlling to open a path for the cable in accordance with the information.

According to various exemplary embodiments, the second power management unit may supply an operating power of the processor, and include a register representing whether the power from the cable is provided.

According to various exemplary embodiments, the cable may include at least one of a universal asynchronous receiver/transmitter (UART) cable or a jig cable.

According to various exemplary embodiments, the information instructing the supplying of the power may be transmitted through a data path between the second power management unit and the processor.

According to various exemplary embodiments, the processor may transmit, to the first power management unit, an instruction of applying a voltage to a pin for data transmission included in the connection unit, in order to open a path for the cable.

According to various exemplary embodiments, as receiving the information instructing the supplying of the power, the processor may set, as 'True', a value of a register representing whether use of a UART is available.

According to various exemplary embodiments, as receiving the information instructing the supplying of the power, the processor may control to perform determination on whether the cable has been inserted, by only a check of a device recognition unique signal pin of the connection unit.

According to various exemplary embodiments, the connection unit may support at least one of a universal serial bus (USB) 2.0 or a USB 3.0.

Figure 3A:
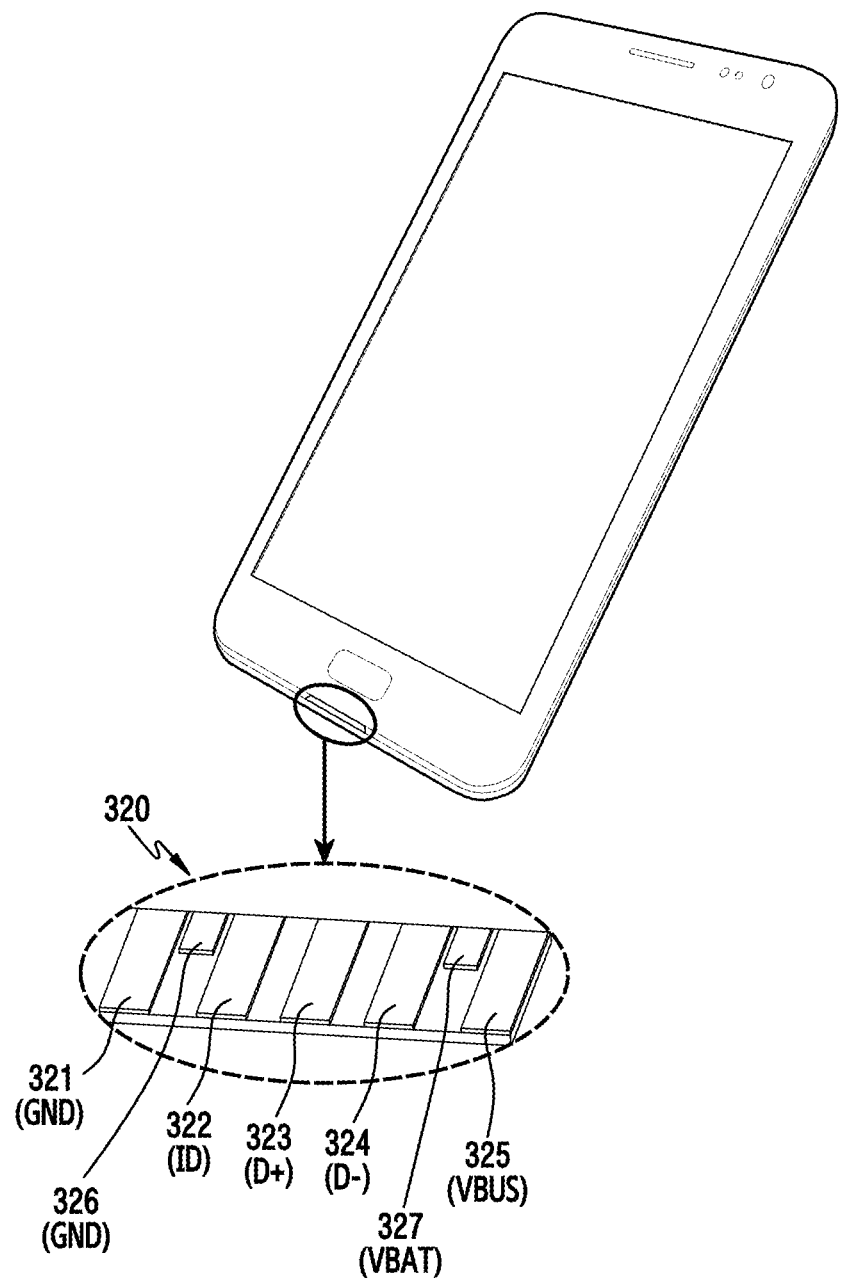
FIG. 3A and FIG. 3B illustrate examples of connectors installed in an electronic device according to various exemplary embodiments of the present disclosure.
Figure 3B:
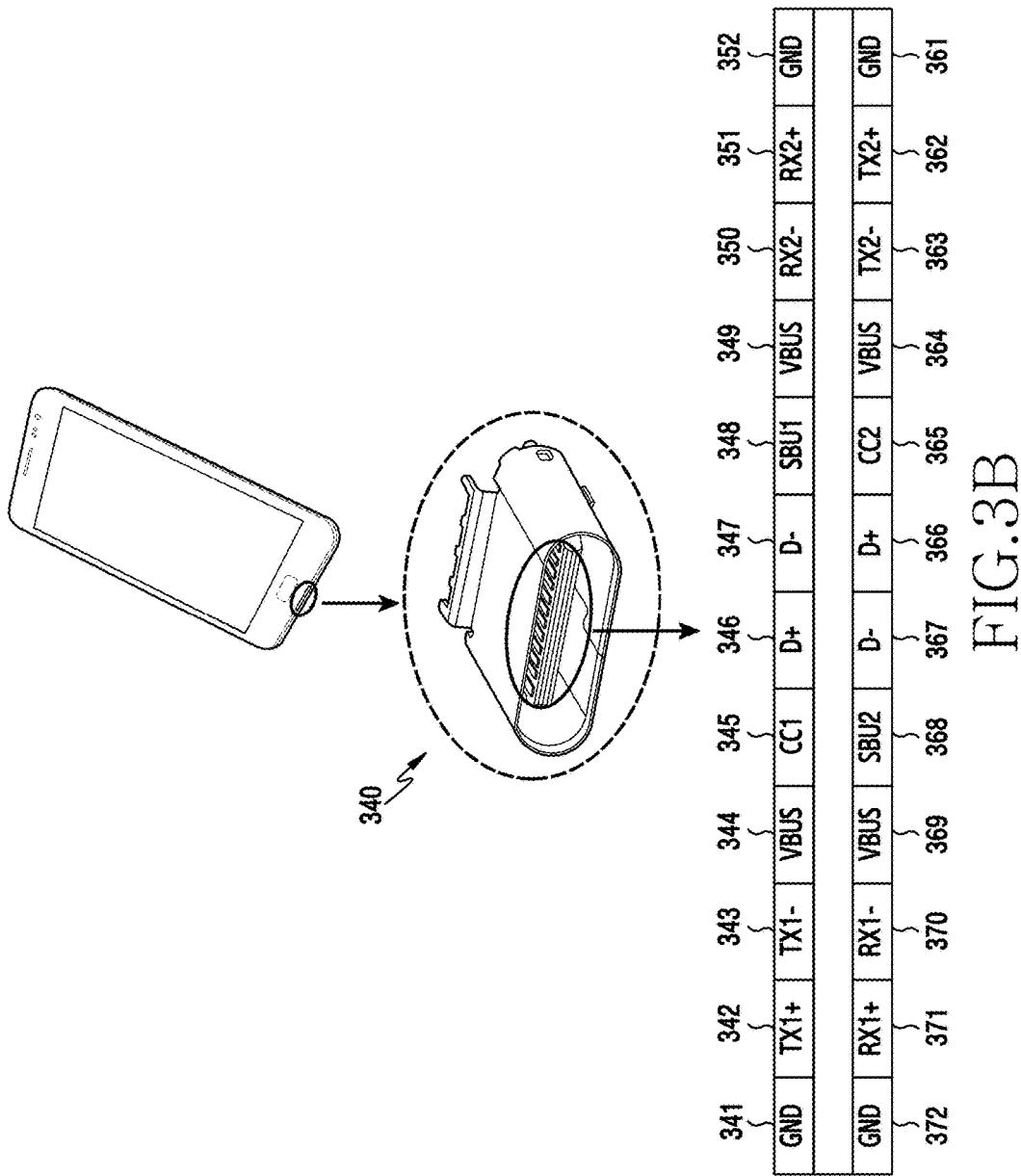

FIG. 3A and FIG. 3B illustrate examples of connectors installed in an electronic device according to various exemplary embodiments of the present disclosure. FIG. 3A and FIG. 3B exemplify constructions of connector ports of various types. In detail, FIG. 3A illustrates a structure of a USB 2.0 type, and FIG. 3B illustrates a structure of a USB 3.0 type.

Referring to FIG. 3A, the electronic device 101 includes an IF connector 320. The IF connector 320 is a constituent element corresponding to the IF connector 171 of FIG. 1. The IF connector 320 includes a ground pin (GND) 321, a device recognition unique signal pin (ID) 322, a data transmission pin (D+) 323, a data reception pin (D−) 324, and/or a charging power pin (VBUS) 325. Also, the IF connector 320 may further include a ground pin (GND) 326 which is used for check such as radio frequency (RF) calibration, and/or an operating power pin (VBAT) 327.

Referring to FIG. 3B, the electronic device 101 includes an IF connector 340. The IF connector 340 is a constituent element corresponding to the IF connector 171 of FIG. 1. The IF connector 340 includes a majority of pins 341 to 352 and 361 to 372. The majority of pins 341 to 352 and 361 to 372 may be distinguished into a first pin set 341 to 352 of a top end and a second pin set 361 to 372 of a bottom end. In detail, the IF connector 340 may include ground pins 341, 352, 361 and 372, pins 342, 343, 350, 351, 362, 363, 370 and 371 supporting high-speed transmission of digital data, pins 344, 349, 364 and 369 supporting power supply, channel configuration (CC) pins 345 and 365, sideband use (SBU) pins 348 and 368, and/or pins 346, 347, 366 and 367 supporting low-speed data transmission. As in FIG. 3B, each pin of the first pin set 341 to 352 and each pin of the second pin set 361 to 372 are disposed to be in symmetry to each other and accordingly to this, they may be operated regardless of an insertion direction of an external connector (or a plug of the external connector).

When a cable (e.g., a UART cable or jig cable) has been inserted into the IF connector 320 illustrated in FIG. 3A, a resistance value is generated in the pin (ID) 322. Similarly, in the case of the IF connector 340 illustrated in FIG. 3B, at cable insertion, a resistance value is generated in the pin (CC1) 345 or pin (CC2) 365. Accordingly, it may be determined whether the cable has been inserted depending on a change of the resistance value measured at the pin (ID) 322 or the pin (CC1) 345 or pin (CC2) 365. However, when considering only the change of the resistance value measured at the pin (ID) 322 or the pin (CC1) 345 or pin (CC2) 365, a phenomenon by moisture or foreign material and the insertion of a cable may be confused with each other. Owing to this, power may be applied to a partial port (e.g., the pin (D+) 323), leading to the corrosion of the IF connector 320 or IF connector 340. Accordingly, various exemplary embodiments for sensing the insertion of a cable in additional consideration of power applied to the pin (VBAT) 327, the pin (VBUS) 344 or the pin (VBUS) 364 are described below.

In accordance with an exemplary embodiment, when the electronic device 101 recognizes power from a UART cable or jig cable, the electronic device 101 may open a UART path. For this, the electronic device 101 may further include an ID pin of an IF connector and a separate hardware constituent element for sensing that UART power is simultaneously applied. For example, the separate hardware constituent element for UART power sensing may be installed in a front end of a processor (e.g., the processor 110).

But, installation of an additional hardware constituent element leads to an increase of a manufacturing cost of the electronic device 101. Also, the installation of the additional hardware constituent element uses a space on a circuit and accordingly to this, increases a limitation of a circuit design. Accordingly, as another exemplary embodiment, an exemplary embodiment capable of recognizing power from a cable without a separate hardware constituent element is described below.

Basically, from a very early phase of booting, system software of the electronic device 101 may know information on whether the electronic device 101 is booted by which power source. If a cable (e.g., a UART cable or jig cable) having power provided through a pin (VBAT) is inserted into the electronic device 101, the electronic device 101 gets automatically booted, and the software gets to know that the electronic device 101 has been booted by power of the cable, not a power key. Based on this, the electronic device 101 may determine UART port open/close at booting. Also, determined information is transferred to a system kernel from a very early phase boot code, and the corresponding information is maintained even after the booting has been completed. Accordingly, finally, the system kernel may determine the UART port open/close using the information on the power.

Figure 4:
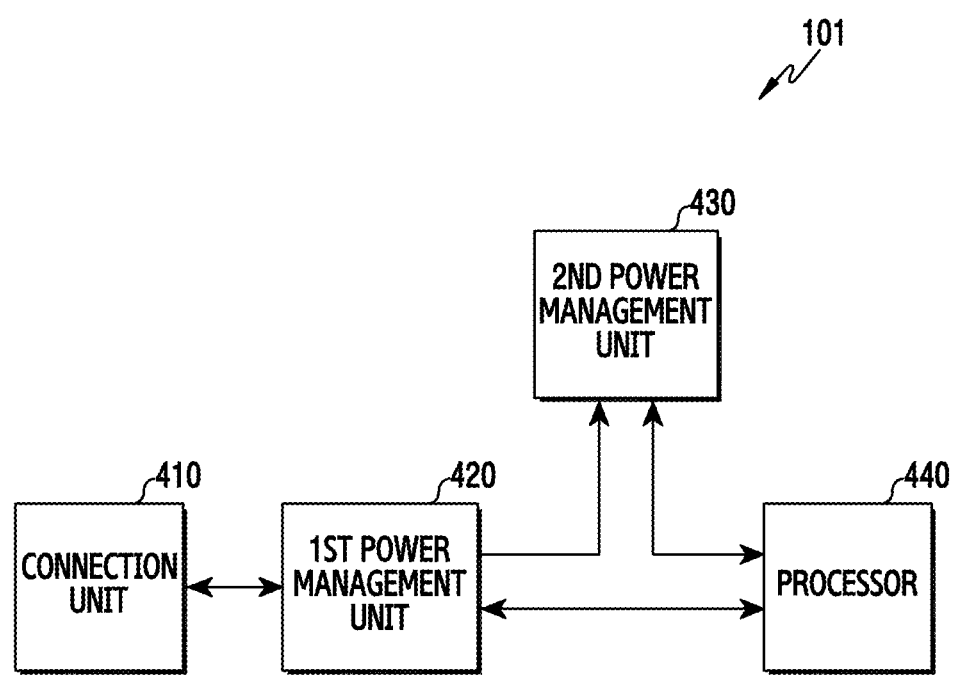
FIG. 4 illustrates a functional construction of an electronic device according to various exemplary embodiments of the present disclosure.

FIG. 4 illustrates a functional construction of the electronic device 101 according to various exemplary embodiments of the present disclosure. That is, the electronic device 101 may be configured as shown in FIG. 4. In other words, some of the constituent elements illustrated in FIG. 1 may be omitted. The terms ' . . . unit', ' . . . er', etc. used below represent the unit of processing at least one function or operation. This may be implemented as hardware or software, or a combination of hardware and software.

Referring to FIG. 4, the electronic device 101 includes a connection unit 410, a first power management unit 420, a second power management unit 430, and a processor 440. The connection unit 410 is a constituent element corresponding to the IF connector 171 of FIG. 1 or the IF connector 320 of FIG. 3. The first power management unit 420 and the second power management unit 430 are constituent elements corresponding to the power management module 195 of FIG. 1. The processor 440 is a constituent element corresponding to the processor 110 of FIG. 1.

The connection unit 410 is a constituent element for physical connection with a cable. For example, the connection unit 410 may have a structure capable of inserting a UART cable. The connection unit 410 includes a majority of pins. For example, the majority of pins may include a pin for data transmission, a pin for device identification (e.g., the pin (ID) 322, the pin (CC1) 345 or the pin (CC2) 365), a pin for power provision (e.g., the pin (VBAT) 327, the pin (VBUS) 344 or the pin (VBUS) 364), etc. For example, the connection unit 410 may be implemented to support a USB 2.0 as in FIG. 3A, or be implemented to support a USB 3.0 as in FIG. 3B.

The first power management unit 420 supplies power used for an operation of the connection unit 410. The first power management unit 420 may convert the supplied power into power of a value usable in the connection unit 410. Also, the first power management unit 420 may recognize power provided from a cable inserted into the connection unit 410. The first power management unit 420 may output a signal (hereinafter, a 'cable power recognition signal') representing that the power from the cable exists. The signal representing that the power from the cable exists may be denoted as "JIG ON". The first power management unit 420 may include at least one register related with setting of a UART path.

The second power management unit 430 supplies power used for an operation of the processor 440. The second power management unit 430 may convert the supplied power into power of a value usable in the processor 440. The second power management unit 430 is a power module used for a booting procedure of the electronic device 101, and has information on the kind of power at booting. For example, the second power management unit 430 may include at least one register representing whether power is provided from a cable. Through this, the second power management unit 430 may confirm a signal (i.e., cable power recognition signal) representing that the power from the cable exists, wherein the signal is outputted from the first power management unit 420. As the second power management unit 430 confirms the cable power recognition signal, the second power management unit 430 transmits information (hereinafter, 'cable power indication information') notifying that the power from the cable inserted into the connection unit 410 is being provided to the processor 440.

The processor 440 controls a general function of the electronic device 101. For example, the processor 440 may control operations of internal constituent elements, i.e., the first power management unit 420 and second power management unit 430 of the electronic device 101. In detail, the processor 440 may set a value of at least one register included in the first power management unit 420 and the second power management unit 430. In accordance with an exemplary embodiment, the processor 440 may receive, from the second power management unit 430, information (i.e., cable power indication information) notifying that power is being provided from a cable inserted into the connection unit 410. As the processor 440 receives the cable power indication information, the processor 440 may sense that a UART cable has been inserted, and control UART path open/close. Here, the UART path open/close may be denoted as 'UART path on/off', or be denoted as 'UART port open/close'.

In the structure exemplified in FIG. 4, in accordance with concrete exemplary embodiments, some constituent elements may be omitted, or two or more constituent elements may be combined as one, or another constituent element may be further added. For example, if the connection unit 410 is implemented to support USB 3.0 as in FIG. 3B, a USB 3.0 integrated circuit (IC) may be further included between the first power management unit 420 and the connection unit 410. Here, the USB 3.0 IC may be implemented in the form of being included in the first power management unit 420.

Figure 5:
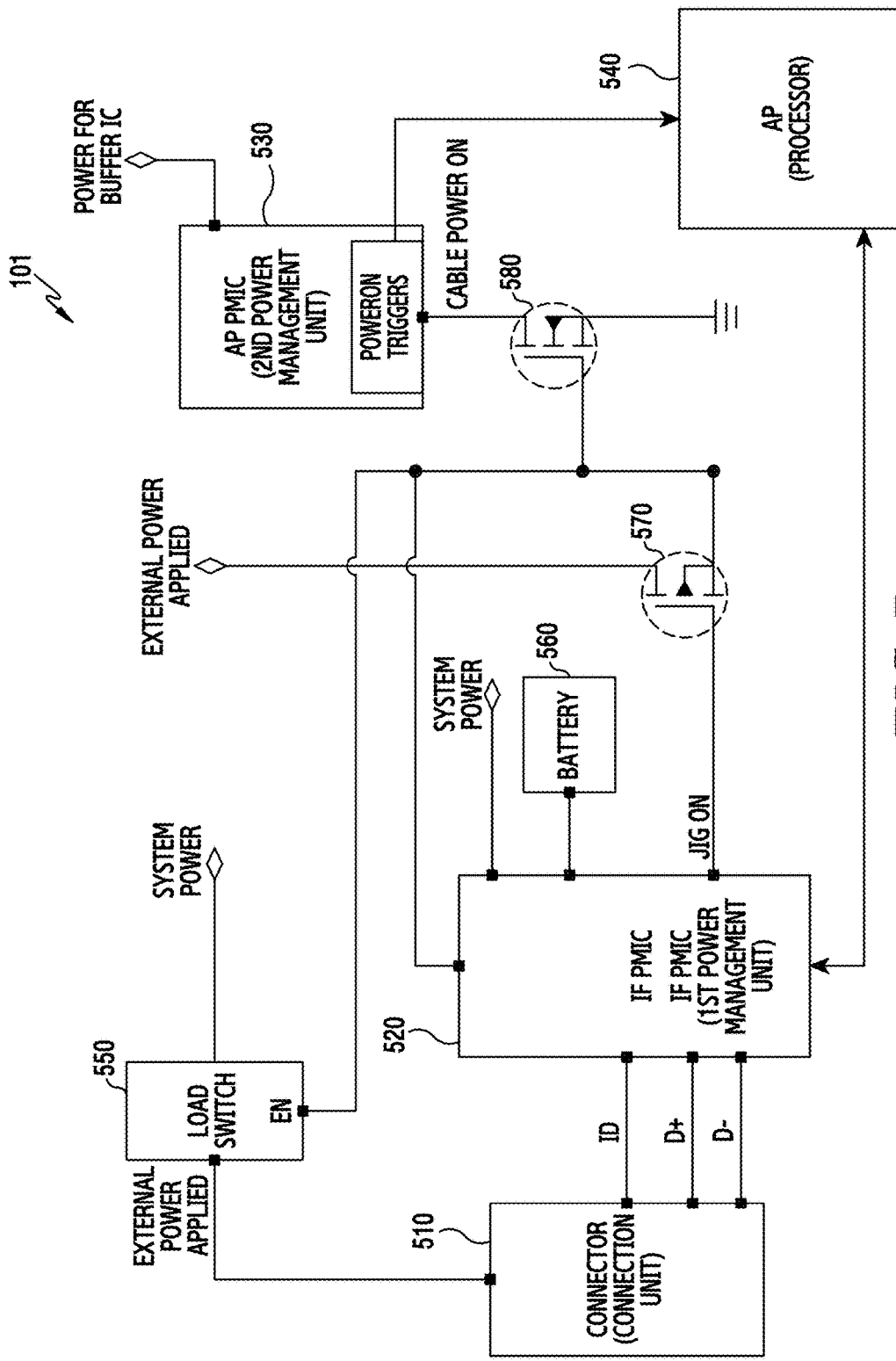
FIG. 5 illustrates an example of a circuit construction of an electronic device according to various exemplary embodiments of the present disclosure.

FIG. 5 illustrates an example of a circuit construction of an electronic device according to various exemplary embodiments of the present disclosure. FIG. 5 exemplifies a circuit construction of the electronic device 101 shown in FIG. 4.

Referring to FIG. 5, the electronic device 101 includes a connector 510, an IF PMIC 520 (first power manager or power management unit), an AP PMIC 530 (second power manager or power management unit), an AP 540, a load switch 550, a battery 560, a first transistor 570, and a second transistor 580. Here, the connector 510 is a constituent element corresponding to the connection unit 410, and the IF PMIC 520 is a constituent element corresponding to the first power management unit 420, and the AP PMIC 530 is an example of the second power management unit 430, and the AP 540 is a constituent element corresponding to the processor 440.

The connector 510, an interface for inserting a cable (e.g., a UART cable or a jig cable), is coupled with the load switch 550 and the IF PMIC 520. The IF PMIC 520 provides power used for an operation of the connector 510, and is coupled with the AP PMIC 530, and is operated according to the control of the AP 540. The AP PMIC 530 provides power used for an operation of the AP 540, and has a data path with the AP 540. The load switch 550 prevents power supplied from the battery 560 from being introduced into the connector 510, i.e., cuts off inverse power or inverse current.

Through a power pin of the connector 510, the IF PMIC 520 checks the existence or non-existence of power of a cable inserted into the connector 510. If the power exists, the IF PMIC 520 outputs a JIG ON signal. For example, the power pin is the pin (VBAT) 327 of FIG. 3A, or is the pin (VBUS) 344 or pin (VBUS) 364 of FIG. 3B. The JIG ON signal is amplified by the first transistor 570 of an N type, and is inverted by the second transistor 580 of a P type and then, is applied to the AP PMIC 530. Accordingly to this, a value of a register CABLE POWER ON included in the AP PMIC 530 is changed. At this time, the second transistor 580 may be omitted according to an attribute of the register CABLE POWER ON.

Figure 6:
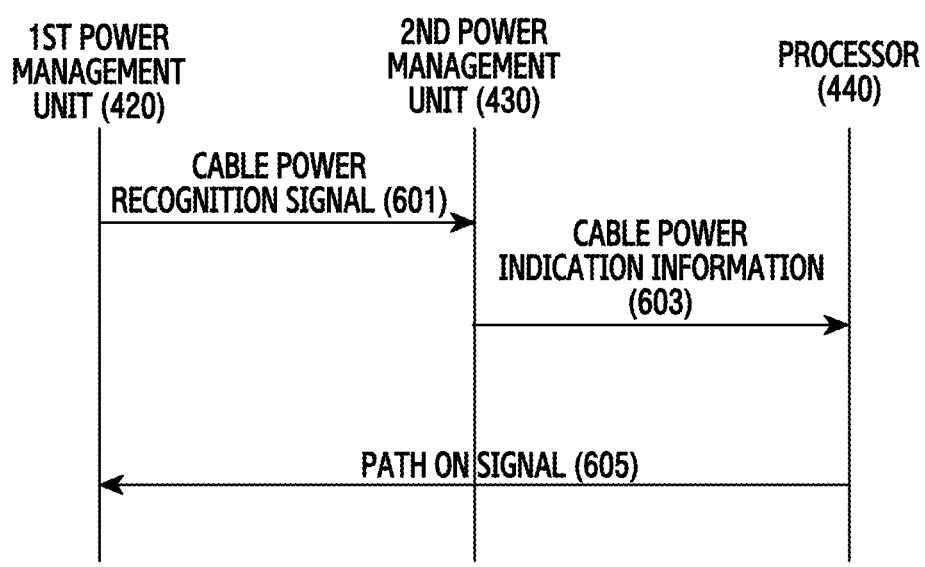
FIG. 6 illustrates a signal exchange among constituent elements of an electronic device according to various exemplary embodiments of the present disclosure.

FIG. 6 illustrates a signal exchange among constituent elements of an electronic device according to various exemplary embodiments of the present disclosure. FIG. 6 exemplifies a flow of an electrical signal and a data signal among the first power management unit 420, second power management unit 430, and processor 440 included in the electronic device 101.

Referring to FIG. 6, in operation 601, the first power management unit 420 outputs a cable power recognition signal to the second power management unit 430. The cable power recognition signal may be the JIG ON signal of FIG. 5. For example, according as a signal of a constant voltage or more is sensed at a specific pin of the connection unit 410, the first power management unit 420 may output the cable power recognition signal. In operation 603, the second power management unit 430 transfers cable power indication information to the processor 440. In other words, the second power management unit 430 transmits, to the second power management unit 430, information notifying that booting goes on by power provided from a UART cable or jig cable. Thereafter, in operation 605, the processor 440 transfers a path ON signal to the first power management unit 420. For example, the path ON signal, which is an instruction of opening a UART path, may change a value of at least one register included in the first power management unit 420.

Figure 7:
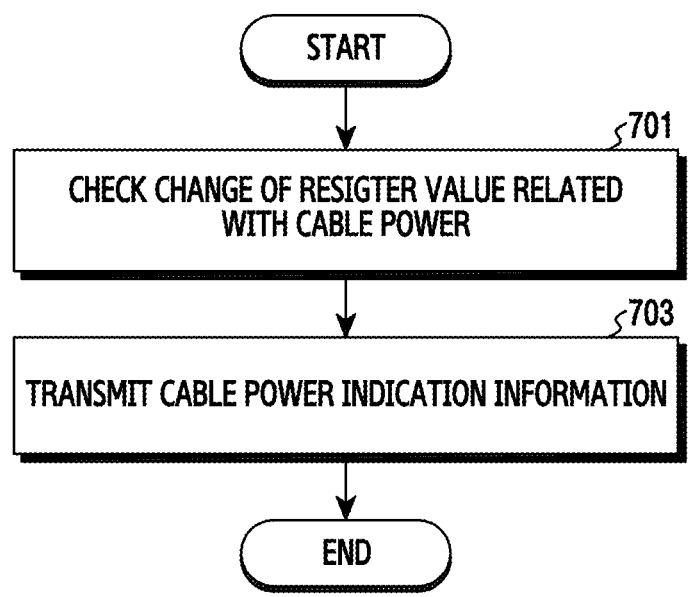
FIG. 7 illustrates a flowchart of a module of supplying power to a processor of an electronic device according to various exemplary embodiments of the present disclosure.

FIG. 7 illustrates a flowchart of a module of supplying power to a processor of an electronic device according to various exemplary embodiments of the present disclosure. FIG. 7 exemplifies an operating method of the second power management unit 430.

Referring to FIG. 7, in operation 701, the second power management unit 430 checks a change of a value of a register related to cable power. The value of the register related to the cable power may be changed by a cable power recognition signal outputted from the first power management unit 420. At this time, when the register related to the cable power has an active-low attribute, the cable power recognition signal may be inverted and then transmitted to the second power management unit 430.

Next, in operation 703, the second power management unit 430 transmits cable power indication information. The cable power indication information is transmitted to the processor 440, and notifies the processor 440 that a booting procedure goes on by power provided from a cable. The cable power indication information, a signal generated by software not an electrical signal, may be transferred through a data path.

Figure 8:
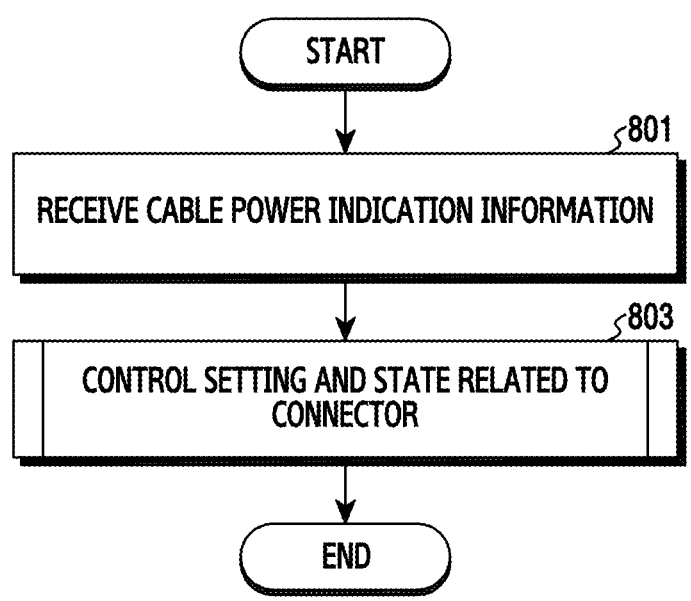
FIG. 8 illustrates a flowchart of a processor of an electronic device according to various exemplary embodiments of the present disclosure.

FIG. 8 illustrates a flowchart of a processor of an electronic device according to various exemplary embodiments of the present disclosure. FIG. 8 exemplifies an operating method of the processor 440.

Referring to FIG. 8, in operation 801, the processor 440 receives cable power indication information. The cable power indication information is received from the second power management unit 430, and notifies the processor 440 that a booting procedure goes on by power provided from a cable. The cable power indication information, a signal generated by software not an electrical signal, may be transferred through a data path.

Thereafter, in operation 803, the processor 440 controls setting and state related to a connector, i.e., the connection unit 410. That is, the processor 440 recognizes that power is provided from the cable, and determines that the cable has been inserted. Accordingly to this, the processor 440 may control the first power management unit 420 to open a path related to the cable.

In the exemplary embodiment described with reference to FIG. 8, the cable power indication information is used to notify that the power is provided from the cable. But, in accordance with another exemplary embodiment, the cable power indication information may be transmitted to notify that the power provided from the cable does not exist. In this case, the processor 440 may more clearly determine that the cable has not been inserted.

Figure 9:
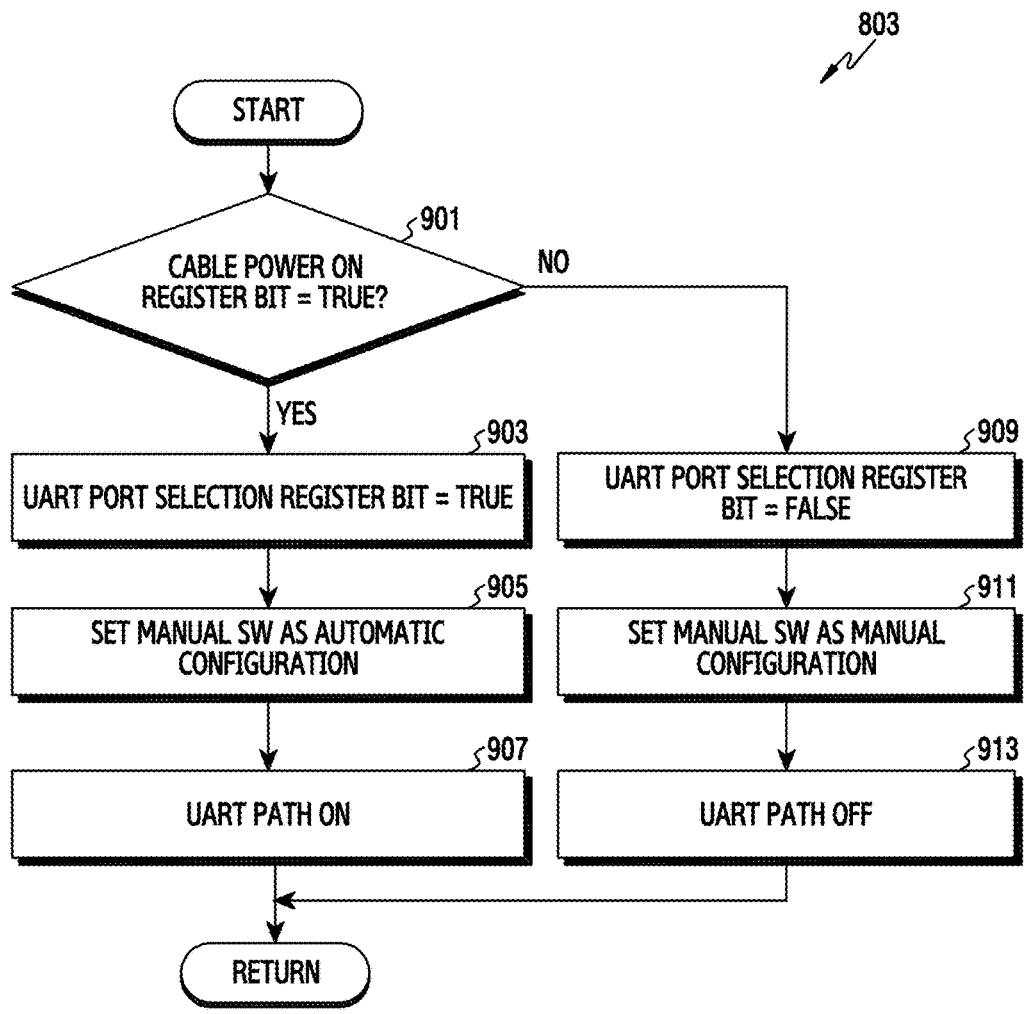
FIG. 9 illustrates a flowchart for universal asynchronous receiver/transmitter (UART) path control of an electronic device according to various exemplary embodiments of the present disclosure.

FIG. 9 illustrates a flowchart for UART path control of an electronic device according to various exemplary embodiments of the present disclosure. FIG. 9 is a concrete example of operation 803 of FIG. 8, and exemplifies an operating method of the processor 440.

Referring to FIG. 9, in operation 901, the processor 440 checks if a value of a CABLE POWER ON register bit is 'True'. CABLE POWER ON is a register whose value is changed as a JIG ON signal is applied to the second power management unit 430. The processor 440 may determine the value of the CABLE POWER ON register bit through cable power indication information received from the second power management unit 430. Here, that the CABLE POWER ON register bit value is 'True' represents that power is being provided through a cable.

If the value of the CABLE POWER ON register bit is 'True', in operation 903, the processor 440 sets a UART port selection register bit as 'True'. A UART port selection register is a register representing whether use of a UART is available. Setting the UART port selection register bit as 'True' represents that the use of the UART is available.

Next, in operation 905, the processor 440 sets a manual switch as an automatic configuration. Setting the manual switch as the automatic configuration represents checking only an ID pin at the time of determining whether a UART cable has been inserted. That is, the processor 440 controls to perform determination on whether the cable has been inserted, by only a check of a device recognition unique signal pin (e.g., ID) of the connection unit 410.

Thereafter, in operation 907, the processor 440 makes a UART path ON. Making the UART path ON may be achieved by applying a voltage to a pin for data transmission (e.g., a pin (D−)) included in the connection unit 410. That is, the processor 440 may transmit, to the first power management unit 420, an instruction of applying the voltage to the pin for data transmission included in the connection unit 410, thereby transiting the UART path to an ON state.

If the value of the CABLE POWER ON register bit is not 'True' in operation 901, in operation 909, the processor 440 sets the UART port selection register bit as 'False'. The UART port selection register bit is a register representing whether use of a UART is available. Setting the UART port selection register bit as 'False' represents that the use of the UART is not available.

Next, in operation 911, the processor 440 sets the manual switch as a manual configuration. Setting the manual switch as the manual configuration represents checking a predefined additional condition in addition to the ID pin at the time of determining whether the UART cable has been inserted. Here, the additional condition may be defined by a manufacturer of the electronic device 101. In various exemplary embodiments, the additional condition may be defined as whether power is supplied from a cable, i.e., whether a voltage of a constant value or more is detected at a power provision pin (e.g., VBAT or VBUS) of the connection unit 410.

Thereafter, in operation 913, the processor 440 makes the UART path OFF. Making the UART path OFF may be achieved by cutting off a voltage to a pin for data transmission (e.g., a pin (D−)) included in the connection unit 410. That is, the processor 440 may transmit, to the first power management unit 420, an instruction of cutting off the voltage to the pin for data transmission included in the connection unit 410, thereby transiting the UART path to an OFF state. However, when the UART path has been in the OFF state before operation 913, an operation of the processor 440 for state transition may be omitted.

According to various exemplary embodiments of the present disclosure, an operating method of an electronic device may include when power is provided from a cable inserted into a connection unit, generating a signal corresponding to the provision of the power, providing information instructing the supplying of the power to a processor, in accordance with the signal, and controlling to open a path for the cable in accordance with the information.

According to various exemplary embodiments, the signal may change a value of a register representing whether the power from the cable is provided.

According to various exemplary embodiments, the cable may include at least one of a universal asynchronous receiver/transmitter (UART) cable or a jig cable.

According to various exemplary embodiments, the information instructing the supplying of the power may be transmitted through a data path between the processor performing an operation of controlling to open the path for the cable and a circuit providing an operating power of the processor.

According to various exemplary embodiments, controlling to open the path for the cable may include outputting an instruction of applying a voltage to a pin for data transmission included in the connection unit.

According to various exemplary embodiments, the method may further include setting, as 'True', a value of a register representing whether use of a UART is available, according to the information instructing the supplying of the power.

According to various exemplary embodiments, the method may further include controlling to perform determination on whether the cable has been inserted by only a check of a device recognition unique signal pin of the connection unit, according to the information instructing the supplying of the power.

According to various exemplary embodiments, the connection unit may support at least one of a universal serial bus (USB) 2.0 or a USB 3.0.

The term "module" used in the present document may include a unit consisting of hardware, software or firmware and, for example, may be used interchangeably with the term "logic", "logic block", "component", "circuit" or the like. The "module" may be an integrally configured component or the minimum unit performing one or more functions or a part thereof. The "module" may be implemented mechanically or electronically. For example, the "module" may include an application-specific integrated circuit (ASIC) chip, a field-programmable gate array (FPGA), or a programmable logic device, which has been known or will be developed in future, performing some operations. At least a part of an apparatus (e.g., modules or functions thereof) or method (e.g., operations) according to various exemplary embodiments may be implemented as an instruction that has been stored in a computer-readable storage media in the form of a program module. When the instruction is executed by a processor (e.g., processor 110), the processor may perform a function corresponding to the instruction. The computer-readable recording media may include a hard disk, a floppy disk, a magnetic media (e.g., a magnetic tape), an optical recording media (e.g., a compact disk-read only memory (CD-ROM) and/or a digital versatile disk (DVD)), a magneto-optical media (e.g., a floptical disk), an internal memory, etc. The instruction may include a code that is made by a compiler or a code that is executable by an interpreter. A module or program module according to various exemplary embodiments may further include at least one or more of the aforementioned constituent elements, or omit some, or further include another constituent element. Operations carried out by a module, a program module or another constituent element according to various exemplary embodiments may be executed in a sequential, parallel, repeated or heuristic method, or at least some operations may be executed in different order or may be omitted, or another operation may be added.

Methods according to exemplary embodiments mentioned in claims or specification of the present disclosure may be implemented in the form of hardware, software, or a combination of the hardware and the software.

In case where the methods are implemented by software, a computer-readable storage media storing one or more programs (i.e., software modules) may be provided. The one or more programs stored in the computer-readable storage media are configured to be executable by one or more processors within an electronic device. The one or more programs include instructions for enabling the electronic device to execute the methods according to the exemplary embodiments stated in the claims or specification of the present disclosure.

This program (i.e., a software module and software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or an optical storage device of another form, and a magnetic cassette. Or, the program may be stored in a memory that is constructed in combination of some or all of them. Also, each constructed memory may be included in plural as well.

Also, the program may be stored in an attachable storage device that may access through a communication network such as the Internet, an intranet, a local area network (LAN), a wireless LAN (WLAN) and a storage area network (SAN), or a communication network constructed by a combination of them. This storage device may connect to a device performing an exemplary embodiment of the present disclosure through an external port. Also, a separate storage device on the communication network may connect to the device performing the exemplary embodiment of the present disclosure as well.

In the aforementioned concrete exemplary embodiments of the present disclosure, constituent elements included in the disclosure have been expressed in the singular form or plural form in accordance to a proposed concrete exemplary embodiment. But, the expression of the singular form or plural form is selected suitable to a proposed situation for description convenience, and it is not that the present disclosure is limited to singular or plural constituent elements. Even a constituent element expressed in the plural form may be constructed in the singular form, or even a constituent element expressed in the singular form may be constructed in the plural form.

While a concrete exemplary embodiment has been explained in the detailed description of the present disclosure, it is undoubted that various modifications are available without departing from the scope of the present disclosure. Therefore, the scope of the present disclosure should not be defined by a limitation to the explained exemplary embodiment and should be defined by not only the scope of claims mentioned below but also equivalents to the scope of these claims.

A method according to various exemplary embodiments and an electronic device thereof may determine whether a cable has been inserted into a connector on the basis of a voltage provided from the inserted cable, thereby preventing the corrosion of the connector caused by erroneous determination. At this time, by transferring the existence of the voltage provided from the cable to the processor in a software manner, costs incurred from additional hardware installation may be excluded.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
  a connector for inserting a cable;
  a first power manager configured to, when power is provided from the cable, output a signal corresponding to the power;
  a second power manager configured to transmit to a processor information notifying that the power is provided from the cable, in accordance with the output of the signal; and
  the processor configured to control the first power manager to open a path for the cable in accordance with the information.

2. The electronic device of claim 1, wherein the second power manager is further configured to supply an operating power of the processor, and includes a register representing whether the power from the cable is provided.

3. The electronic device of claim 1, wherein the cable includes at least one of a universal asynchronous receiver/transmitter (UART) cable or a jig cable.

4. The electronic device of claim 1, wherein the information notifying that the power is provided from the cable is transmitted through a data path between the second power manager and the processor.

5. The electronic device of claim 1, wherein the processor is further configured to transmit, to the first power manager, an instruction of applying a voltage to a pin for data transmission included in the connector, in order to open a path for the cable.

6. The electronic device of claim 1, wherein the processor is further configured to, as the processor receives the information notifying that the power is provided from the cable, set, as 'True', a value of a register representing whether use of a UART is available.

7. The electronic device of claim 1, wherein the processor is further configured to, as the processor receives the information notifying that the power is provided from the cable, set, as 'False', a value of a register representing whether use of a UART is available.

8. The electronic device of claim 1, wherein the processor is further configured to, as the processor receives the information notifying that the power is provided from the cable, control to perform a determination on whether the cable has been inserted, by only a check of a device recognition unique signal pin of the connector.

9. The electronic device of claim 1, wherein the processor is further configured to, as the processor receives the information notifying that the power is provided from the cable, control to perform a determination on whether the cable has been inserted, by a check of a device recognition unique signal pin of the connector and by a check of a predefined additional condition.

10. The electronic device of claim 1, wherein the connector supports at least one of a universal serial bus (USB) 2.0 or a USB 3.0.

11. A method for operating an electronic device, the method comprising:
when power is provided from a cable inserted into a connector, generating by a power manager a signal corresponding to the power;
transmitting to a processor information notifying that the power is provided from the cable, in accordance with the signal; and
controlling the power manager to open a path for the cable in accordance with the information.

12. The method of claim 11, wherein the signal changes a value of a register representing whether the power from the cable is provided.

13. The method of claim 11, wherein the cable includes at least one of a universal asynchronous receiver/transmitter (UART) cable or a jig cable.

14. The method of claim 11, wherein the information notifying that the power is provided from the cable is transmitted through a data path between the processor performing an operation of controlling to open the path for the cable and a circuit providing an operating power of the processor.

15. The method of claim 11, wherein controlling to open the path for the cable includes outputting an instruction of applying a voltage to a pin for data transmission included in the connector.

16. The method of claim 11, further comprising setting, as 'True', a value of a register representing whether use of a UART is available, according to the information notifying that the power is provided from the cable.

17. The method of claim 11, further comprising setting, as 'False', a value of a register representing whether use of a UART is available, according to the information notifying that the power is provided from the cable.

18. The method of claim 11, further comprising controlling to perform a determination on whether the cable has been inserted by only a check of a device recognition unique signal pin of the connector, according to the information notifying that the power is provided from the cable.

19. The method of claim 11, further comprising controlling to perform a determination on whether the cable has been inserted by a check of a device recognition unique signal pin of the connector and by a check of a predefined additional condition, according to the information notifying that the power is provided from the cable.

20. The method of claim 11, wherein the connector supports at least one of a universal serial bus (USB) 2.0 or a USB 3.0.

* * * * *